United States Patent [19]

Kayane et al.

[11] Patent Number: 4,841,027
[45] Date of Patent: Jun. 20, 1989

[54] PROCESS FOR PREPARING PHENYL- AND NAPHTHYLAZO-AMINONAPHTHOL SULPHONIC ACIDS

[75] Inventors: Yutaka Kayane, Moriguchi; Takashi Omura, Ashiya; Yasuo Tezuka, Nara; Hideharu Sone, Toyonaka, all of Japan

[73] Assignee: Sumitomo Chemical Company, Limited, Osaka, Japan

[21] Appl. No.: 700,063

[22] Filed: Feb. 11, 1985

Related U.S. Application Data

[63] Continuation of Ser. No. 377,054, May 11, 1982, abandoned.

[30] Foreign Application Priority Data

May 14, 1981 [JP] Japan ................................. 56-73191

[51] Int. Cl.$^4$ ..................... C09B 41/00; C09B 41/136; C09B 62/028; C09B 62/51
[52] U.S. Cl. .................................. 534/599; 534/591; 534/841; 534/842; 534/581; 534/582; 534/887; 534/617; 534/642; 534/638; 534/635; 534/637
[58] Field of Search ................ 260/198, 199; 534/591, 534/841, 842, 599

[56] References Cited

U.S. PATENT DOCUMENTS

| | | | |
|---|---|---|---|
| 2,384,750 | 9/1945 | Knight et al. | 260/199 |
| 2,656,346 | 10/1953 | Knecht et al. | 260/159 |
| 2,849,436 | 8/1953 | Buehler | 260/198 X |
| 2,938,896 | 5/1960 | Strobel et al. | 260/198 X |
| 2,973,351 | 2/1961 | De Montmollin et al. | 260/199 |
| 3,649,615 | 3/1972 | Ikeda et al. | 260/199 |

FOREIGN PATENT DOCUMENTS

| | | | |
|---|---|---|---|
| 740715 | 11/1955 | United Kingdom | 260/174 |
| 785120 | 10/1957 | United Kingdom | 260/153 |
| 785202 | 10/1957 | United Kingdom | 260/153 |
| 785222 | 10/1957 | United Kingdom | 260/153 |
| 984904 | 3/1965 | United Kingdom | 260/198 |
| 1012479 | 12/1965 | United Kingdom | 260/198 |
| 1093923 | 12/1967 | United Kingdom | 260/174 |
| 1093929 | 12/1967 | United Kingdom | 260/174 |
| 1242047 | 8/1971 | United Kingdom | 260/184 |
| 1242478 | 8/1971 | United Kingdom | 260/184 |

OTHER PUBLICATIONS

Fibre-Reactive Dyes; W. F. Beech, 1970.

*Primary Examiner*—Floyd D. Higel
*Attorney, Agent, or Firm*—Stevens, Davis, Miller & Mosher

[57] ABSTRACT

Improvement in a process for producing an arylazo-aminonaphtholsulfonic acid represented by a free acid of the formula,

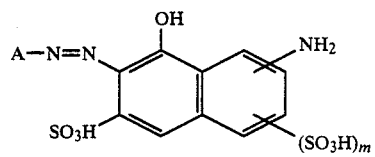

wherein A is a phenyl or naphthyl group unsubstituted or substituted by one to four members selected from alkyl, alkoxy, phenoxy, sulfonic acid, carboxylic acid, arylamino, amino, nitro and hydroxyl groups and halogen atoms, and m is 0 or 1, which comprises reacting an aminonaphtholsulfonic acid represented by a free acid of the formula,

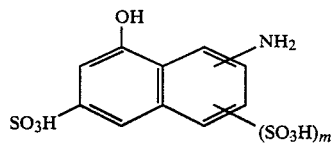

wherein m is as defined above, with a dibasic acid anhydride to obtain an acylaminonaphtholsulfonic acid, coupling a diazonium compound of amine of the formula,

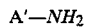

A'—NH$_2$ wherein A' is a phenyl or naphthyl group unsubstituted or substituted by one to four members selected from alkyl, alkoxy, phenoxy, sulfonic acid, carboxylic acid, arylamino, acrylamino, nitro and hydroxyl groups and halogen atoms, with the acylaminonaphtholsulfonic acid, and then subjecting the resulting coupling product to hydrolysis in the presence of an acid or an alkali. The arylazo-aminonaphtholsulfonic acid is useful as acid dyes or acid mordant dyes in itself as well as an important intermediate for the production of reactive dyes or direct dyes.

4 Claims, No Drawings

PROCESS FOR PREPARING PHENYL- AND NAPHTHYLAZO-AMINONAPHTHOL SULPHONIC ACIDS

This application is a continuation of Ser. No. 377,054 filed May 11, 1982, and now abandoned.

This invention relates to a novel process for producing arylazo-aminonaphtholsulfonic acids, which acids are useful as acid dyes or acid mordant dyes in themselves, as well as being important intermediates for reactive dyes or direct dyes. More particularly, this invention relates to a process for producing arylazo-aminonaphtholsulfonic acids represented by a free acid of the formula (I),

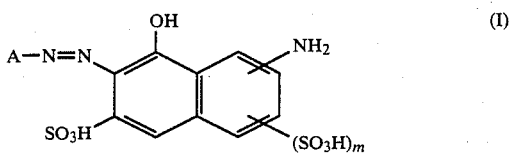

wherein A is a phenyl or naphthyl group unsubstituted or substituted by one to four members selected from alkyl, alkoxy, phenoxy, sulfonic acid, carboxylic acid, arylamino, amino, nitro and hydroxyl groups and halogen atoms, and m is 0 or 1.

Generally speaking, the arylazo-aminonaphtholsulfonic acid can be produced by a coupling reaction between the corresponding aminonaphtholsulfonic acid and a diazonium compound of the corresponding amine. It is, however, known that the coupling reaction can be carried out under acidic conditions to form a coupling product governed by the amino group of the aminonaphtholsulfonic acid (hereinafter referred to as "acid coupling product"), whereas the coupling reaction can be carried out under alkaline conditions to form a coupling product governed by the hydroxyl group of the aminonaphtholsulfonic acid (hereinafter referred to as "alkali coupling product"), as described in SENRYO KAGAKU, edited by Yutaka Hosoda, page 148 (published by Gihodo, 1957).

However, it is difficult to selectively produce only the desired compound by merely maintaining the pH value in the coupling reaction under either acidic or alkaline conditions. Moreover, a bisazo compound is also formed in addition to the acid coupling product or the alkali coupling product, so that the product obtained is a mixture of these compounds.

Some production processes have hitherto been proposed in order to selectively produce only one kind of coupling product selectively.

For example, there is mentioned in Japanese Patent Kokai (Laid-Open) No. 319/74 a process comprising a coupling reaction in the presence of thiourea in a low pH region in order to selectively obtain the acid coupling product of 4-amino-5-hydroxynaphthalene-2,7-disulfonic acid.

On the other hand, as a process for selectively obtaining the alkali coupling product, a process which comprises protecting the amino group of the aminonaphtholsulfonic acid with cyanuric chloride and then carrying out the coupling reaction is mentioned in British Pat. Nos. 785,120 and 785,222.

However, this process suffers from the drawbacks that a condensation product of cyanuric chloride and two molecules of aminonaphtholsulfonic acid and a condensation product between cyanuric chloride and the hydroxyl group of aminonaphtholsulfonic acid are by-produced in a considerable amount in the course of condensation between the aminonaphtholsulfonic acid and cyanuric chloride because of their high reactivities, and that the chlorine atom remaining on the cyanuric ring is hydrolyzed to yield a hydroxyl group in the course of the coupling reaction so that valueless by-products are formed.

As another process for selectively producing the alkali coupling product, there is mentioned in British Pat. Nos. 785,120 and 785,222 a process which comprises protecting the amino group of the aminonaphtholsulfonic acid by acetylating it, then carrying out a coupling reaction and finally hydrolyzing the acetylamino group in the presence of an alkali.

In this process, wherein acetic anhydride is usually employed as an acetylating agent, there is a problem that the hydroxyl group of aminonaphtholsulfonic acid is simultaneously acetylated and therefore a large amount of diacetyl compound having no ability of coupling is formed as a by-product. Therefore, the acetic anhydride must be used in an excessive amount compared to the amount of aminonaphtholsulfonic acid required. Further, due to the existence of the diacetyl product (by-product), a great decrease in yield occurs if the coupling reaction is carried out directly.

Further, since the acetylated aminonaphtholsulfonic acid and its coupling product usually have a low solubility, a large quantity of solvent (usually water) must be used in the coupling reaction, which results in a marked decrease in productivity. If the coupling reaction is carried out in the insoluble state, the viscosity of the reaction mixture becomes very high and the yield of by-products increases.

Further, after completion of the coupling reaction, the acetylamino group is difficult to hydrolyze so that an excessive amount of acid or alkali must be used and a reaction temperature of as high as 80°-100° C. must be employed. As a result, side reactions such as decomposition of the azo group often take place to lower the product yield. In addition, acetic anhydride has a danger of inflammation and has problems in handling, such as its odor.

It is under the above-described circumstances that the present inventors have conducted elaborate studies concerning a method of protecting the amino group, with the objective of producing the alkali coupling product in an industrially advantageous manner. As a result of these studies, it was found that a process using dibasic acid anhydride such as maleic anhydride, succinic anhydride or the like is quite effective.

The present invention provides a process for producing the arylazo-aminonaphtholsulfonic acid of the formula (I) which comprises reacting an aminonaphtholsulfonic acid represented by a free acid of formula (II),

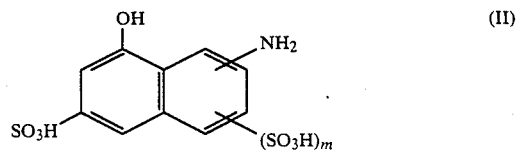

wherein m is 0 or 1, with a dibasic acid anhydride to obtain an acylaminonaphtholsulfonic acid, coupling a diazonium compound of amine of the formula (III), $$A'-NH_2 \qquad (III)$$

wherein A' is a phenyl or naphthyl group unsubstituted or substituted by one to four members selected from alkyl, alkoxy, phenoxy, sulfonic acid, carboxylic acid, arylamino, acylamino, nitro and hydroxyl groups and halogen atoms; with the acylaminonaphtholsulfonic acid, and then subjecting the resulting coupling product to hydrolysis in the presence of an acid or an alkali.

In accordance with the process of the present invention, a dibasic acid anhydride such as maleic anhydride and succinic anhydride is used as the acylating agent for the aminonaphtholsulfonic acid (II), whereby only the amino group is selectively and quantitatively acylated without formation of any by-product as appeared in the aforesaid processes wherein cyanuric chloride or acetic anhydride is as the acylating agent. The process of the present invention is characterized by the following advantages.

In the acylation step, the acylating agent may be used in an amount almost equivalent to the aminonaphtholsulfonic acid (II).

In the coupling step, the desired alkali coupling product may be produced selectively in a high yield, because the coupling reaction may be performed in the absence of any acylation by-product, and no viscosity increase appears in the course of the coupling reaction because the solubility of the acylation product is improved due to the remaining water-soluble carboxylic acid resulting from the dibasic acid anhydride.

In the hydrolysis step, the reaction may be carried out under much milder conditions than the acetylation product, either under acidic conditions or under alkaline condition. For example, the amount of acid or alkali to be added may be very small, the reaction temperature is as low as about 50°–70° C. and the reaction time is short.

Hereunder, the process of the present invention will be explained in more detail.

As examples of aminonaphtholsulfonic acid represented by formula (II), there can be referred to:
4-amino-5-hydroxynaphthalene-2,7-disulfonic acid,
4-amino-5-hydroxynaphthalene-1,7-disulfonic acid,
3-amino-5-hydroxynaphthalene-2,7-disulfonic acid,
2-amino-5-hydroxynaphthalene-1,7-disulfonic acid,
6-amino-4-hydroxynaphthalene-2-sulfonic acid,
7-amino-4-hydroxynaphthalene-2-sulfonic acid,
8-amino-4-hydroxynaphthalene-2-sulfonic acid, and the like.

As examples of the dibasic acid anhydride utilized in the process of this invention, maleic anhydride, succinic anhydride, glutaric anhydride, phthalic anhydride, citraconic anhydride, methylsuccinic anhydride and the like can be referred to, among which maleic anhydride and succinic anhydride are particularly preferable.

In acylating the aminonaphtholsulfonic acid of formula (II) with said dibasic acid anhydride, the acid anhydride is added in an amount almost equimolar to the aminonaphtholsulfonic acid (II) to a solution or a suspension of the aminonaphtholsulfonic acid or its salt at a temperature of 0°–80° C., preferably 10°–40° C., and then the pH of the resulting mixture is adjusted to 2–12, preferably 4–10, with an alkali such as sodium hydroxide, potassium hydroxide, lithium hydroxide, calcium hydroxide, sodium carbonate, potassium carbonate, sodium bicarbonate, calcium carbonate, calcium oxide or the like. In this procedure, the alkali may be added to the solution or suspension of aminonaphtholsulfonic acid prior to addition of the acid anhydride, or it may be added simultaneously with the acid anhydride, or it may be added after addition of the acid anhydride.

The acyl compound thus obtained is then coupled with a diazonium compound prepared by diazotizing the amine of formula (III) in a conventional manner. The coupling reaction may be carried out at a temperature of −10° C. to +50° C., preferably 0° C. to +30° C., and at a pH value of 3–11, preferably 4–8.

The hydrolysis of the acylamino group of the coupling product may be carried out using 0.1 to 3 moles of an acid or an alkali per mole of the coupling product at a temperature of 50°–100° C., preferably 60°–80° C.

As the acid utilized for the hydrolysis, inorganic acids such as hydrochloric acid, sulfuric acid, hydrobromic acid and the like, organic acids such as acetic acid, fumaric acid and the like, and the acids formed as a by-product of the process such as maleic acid or succinic acid, can be used. As the alkali utilized, hydroxides, oxides and carbonates of alkali metals and alkaline earth metals, preferably sodium hydroxide and potassium hydroxide, can be used.

The compound of formula (I) thus obtained scarcely contains by-products and has a high purity. Therefore, it is useful in itself as an acid dye or an acid mordant dye, and also is useful as an intermediate for the production of a number of useful reactive dyes or direct dyes. For example, the arylazo-aminonaphtholsulfonic acid thus obtained may be subjected to reaction with trihalogenotriazine, monoamino- and mono-substituted-amino-dihalogenotriazines, alkoxy-dihalogenotriazine, β-sulfatoethylsulfonylanilino-dihalogenotriazine, tetrahalogenopyrimidine, trihalogenopyrimidine, dihalogeno-methylsulfonyl-methylpyrimidine, dihalogenoquinoxaline-6-carboxylic acid halide and the like, whereby there may be obtained a reactive dye represented by a free acid of the formula,

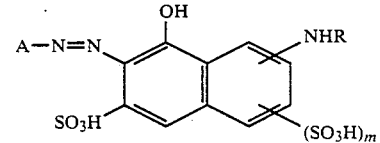

wherein A and m are as defined above, and R is a fiber-reactive group such as 4-(substituted amino)-6-halogeno-(e.g. chloro or fluoro)-1,3,5-triazin-2-yl, 4,6-dihalogeno-1,3,5-triazin-2-yl, 4-alkoxy-6-halogeno-1,3,5-triazin-2-yl, 2,4,5-trihalogeno-1,3-diazin-6-yl, 2-methylsulfonyl-4-methyl-5-chloro-1,3-diazin-6-yl, 2,3-dichloro-1,4-quinoxaline-6-carbonyl, 2,4-difluoro-5-chloro-1,3-diazin-6-yl, 4-(β-sulfatoethylsulfonylanilino)-6-chloro-1,3,5-triazin-2-yl and the like. The reactive dye is useful for dyeing cellulose fibers to give a brilliant dyed product with good build-up property.

This invention will be explained in more detail with reference to the following examples, wherein parts and % are by weight.

EXAMPLE 1

Into 150 parts of water was dissolved 34.1 parts of the monosodium salt of 4-amino-5-hydroxynaphthalene-2,7-disulfonic acid (H acid) while adjusting the pH value to 6–7 with an aqueous solution of sodium hydroxide, and then 8.4 parts of sodium bicarbonate was added. After adding 9.8 parts of maleic anhydride to the solution at a temperature of 20°–25° C., the mixture was stirred at this temperature for one hour.

The mixture was then cooled to 5°–10° C., and a solution prepared by diazotizing 2-aminonaphthalene-1,5-disulfonic acid (30.3 parts) by the usual method was added thereto while maintaining a pH value of 5–6 by the use of 20% aqueous solution of sodium carbonate. After stirring the mixture at this temperature for 3 hours, 6.0 parts of sodium hydroxide was added and the temperature was raised to 60° C. After keeping the mixture at this temperature for 4 hours and then neutralizing it to pH 6–7 with hydrochloric acid, an amount, corresponding to 20% of the amount of the liquid mixture, of sodium chloride was added to deposit a crystalline product. By collecting the crystal by filtration, a compound represented by the following formula was obtained in a yield of 96%.

In another run, the above-mentioned procedure was repeated, except that acetic anhydride was substituted for the maleic anhydride. The results of the two runs are compared in Table 1.

TABLE 1

| Acylating agent | Necessary amount of acylating agent*1 (mol/mol) | Composition after acylation | | Liquid viscosity at the time of coupling | Conditions of hydrolysis of acylamino group*2 | | Yield (%) |
| | | N—Acyl compound (%) | Diacyl compound (%) | | Amount of hydrochloric acid (mol/mol) | Temperature (°C.) | |
| --- | --- | --- | --- | --- | --- | --- | --- |
| Maleic anhydride | 1.0 | 99 | 0 | Good | 1.5 | 60 | 96 |
| Acetic anhydride | 1.5 | 80 | 18 | Very viscous | 2.5 | 80 | 73 |

*1 Molar ratio of acylating agent to H acid necessary for making the amount of unreacted H acid 1% by mole or less.
*2 Amount of sodium hydroxide (molar ratio to H acid) and reaction temperature necessary for making the amount of unreacted acetylamino compound 1% by mole or less within 5 hours.

EXAMPLE 2

The compound obtained in Example 1 was dissolved into 700 parts of water and cooled to 0°–5° C., to which was dropped 13.0 parts of cyanuric fluoride while maintaining the pH value at 5–6 by the use of 10% aqueous solution of sodium carbonate. After stirring the mixture at this temperature for 2 hours, 12.1 parts of p-chloroaniline was added and the temperature was evaluated to 20° C. while adjusting pH to 6–7. After stirring the reaction mixture at this temperature for 6 hours, it was dried in vacuum at a temperature not higher than 50° C. The die thus obtained was a clear red reactive dye having the following formula:

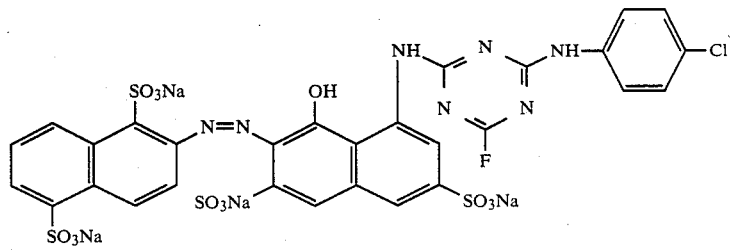

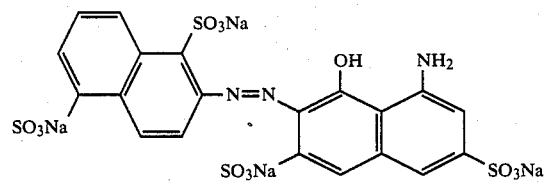

EXAMPLES 3–6

By repeating the procedure of Example 1, the compounds of formula shown in Table 2 were obtained in high yields from the aminonaphtholsulfonic acid (II) and amine (III) as shown in the Table.

TABLE 2

| Example No. | Aminonaphthol-sulfonic acid (II) | Acylating agent | Amine (III) | Arylazo-aminonaphthol-sulfonic acid (I) | Yield |
| --- | --- | --- | --- | --- | --- |
| 3 | ![structure] | Maleic anhydride | ![structure] | ![structure] | 96% |

TABLE 2-continued

| Example No. | Aminonaphthol-sulfonic acid (II) | Acylating agent | Amine (III) | Arylazo-aminonaphthol-sulfonic acid (I) | Yield |
|---|---|---|---|---|---|
| 4 | ![structure] OH NH₂ / SO₃H / SO₃H | Succinic anhydride | ![structure] SO₃H / NH₂ | ![structure] | 94% |
| 5 | ![structure] OH NH₂ / SO₃H / SO₃H | Maleic anhydride | ![structure] Cl / NH₂ | ![structure] | 95% |
| 6 | ![structure] OH / NH₂ / SO₃H / SO₃H | Maleic anhydride | ![structure] OCH₃ / NH₂ / CH₃ | ![structure] | 92% |

EXAMPLE 7

Into 150 parts of water was dissolved 34.1 parts of the monosodium salt of 4-amino-5-hydroxynaphthalene-2,7-disulfonic acid while adjusting the pH value to 7–8 with an aqueous solution of sodium hydroxide. To the solution was added 9.8 parts of maleic anhydride at a temperature of 10°–15° C. while maintaining the pH at 7–8 by the use of a 10% aqueous solution of sodium hydroxide, and the resulting mixture was stirred at this temperature for 2 hours. Then, a solution prepared by diazotizing 30.3 parts of 2-aminonaphthalene-1,5-disulfonic acid by the usual method was added while maintaining the pH at 5–6 by the use of a 20% aqueous solution of sodium carbonate. After stirring the resulting mixture at this temperature for 4 hours, the pH was adjusted to 4 with hydrochloric acid and the temperature was elevated to 60° C. After keeping the mixture at this temperature for 5 hours and then neutralizing it to pH 6–7 with an aqueous solution of sodium hydroxide, an amount, corresponding to 20% of the amount of the liquid mixture, of sodium chloride was added to deposit a crystalline product. By collecting the crystal by filtration, a compound represented by the following formula was obtained in a yield of 96%.

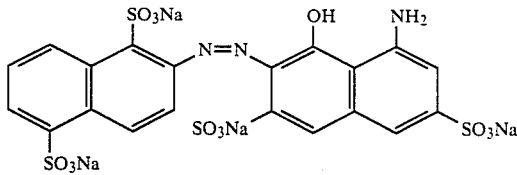

EXAMPLE 8

The compound obtained in Example 7 was dissolved into 700 parts of water and cooled to 5°–10° C. after which 17.7 parts of cyanuric chloride was added. While maintaining the pH value of the mixture at 4–5 by the use of a 20% aqueous solution of sodium carbonate, it was stirred at this temperature for 3 hours. Then, 27 parts of 1-aminobenzene-3-β-hydroxyethylsulfone-sulfuric ester was added. The reaction mixture was heated to 20° C. while adjusting its pH to 5–6, stirred at this temperature for 4 hours, and then spray-dried.

The dye thus obtained was a clear red reactive dye having the following formula:

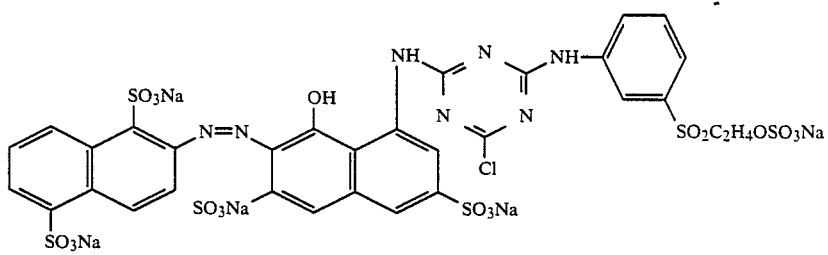

EXAMPLES 9–12

By repeating the procedure of Example 7, the compounds shown in Table 3 were obtained in high yields from the aminonaphtholsulfonic acid (II) and amine (III) shown in the following Table 3.

TABLE 3

| Example No. | Aminonaphthol-sulfonic acid (II) | Acylating agent | Amine (III) | Arylazo-aminonaphthol-sulfonic acid (I) | Yield |
|---|---|---|---|---|---|
| 9 | ![structure] OH, SO₃H, NH₂ | Maleic anhydride | ![structure] SO₃H, NH₂, SO₃H | ![structure] SO₃H, N=N, OH, SO₃H, NH₂, SO₃H | 95% |
| 10 | ![structure] OH, SO₃H, NH₂ | Succinic anhydride | ![structure] SO₃H, CH₃O, NH₂, SO₃H | ![structure] SO₃H, CH₃O, N=N, OH, SO₃H, NH₂ | 94% |
| 11 | ![structure] OH, NH₂, SO₃H | Maleic anhydride | ![structure] SO₃H, NH₂, SO₃H | ![structure] SO₃H, N=N, OH, NH₂, SO₃H, SO₃H | 94% |
| 12 | ![structure] OH, SO₃H, NH₂ | Succinic anhydride | ![structure] SO₃H, NH₂, SO₃H | ![structure] SO₃H, N=N, OH, SO₃H, NH₂ | 92% |

EXAMPLE 13

Into 150 parts of water was dissolved 34.1 parts of the monosodium salt of 4-amino-5-hydroxynaphthalene-2,7-disulfonic acid (H acid) while adjusting the pH value to 6–7 with an aqueous solution of sodium hydroxide, after which 8.4 parts of sodium bicarbonate was added. To the solution was added 9.8 parts of maleic anhydride at a temperature of 20°–25° C., and the resulting mixture was stirred at this temperature for one hour.

The mixture was then cooled to 5°–10° C., and a solution prepared by diazoatizing 17.3 parts of orthanilic acid by the usual method was added while maintaining the pH value at 5–6 by the use of a 20% aqueous solution of sodium carbonate. After stirring the mixture at this temperature for 3 hours, it pH was adjusted to 3 with hydrochloric acid and its temperature was elevated to 60° C. After keeping the mixture at this temperature for 4 hours and then neutralizing it to pH 6–7 with sodium hydroxide solution, an amount, corresponding to 20% of the amount of the liquid mixture, of sodium chloride was added to deposit a crystalline product. By collecting the crystal by filtration, a compound represented by the following formula was obtained in a yield of 96%.

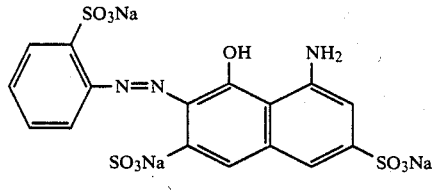

EXAMPLE 14

The compound obtained in Example 13 was dissolved into 1,000 parts if water, to which was added 17.9 parts of cyanuric chloride at 10°–15° C. The resulting mixture was stirred for 3 hours while adjusting the pH value to 5–6 with a 20% aqueous solution of sodium carbonate. Then, 10.2 parts of N-methylaniline was added. The resulting mixture was heated to 30° C. while adjusting its pH to 6–7, stirred at this temperature for 5 hours, and then spray-dried. The dye thus obtained was a clear red reactive dye having the following formula:

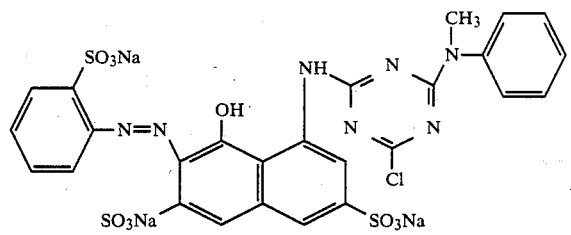

EXAMPLE 15

Into 500 parts of water was dissolved 23.9 parts of 7-amino-4-hydroxynaphthalene-2-sulfonic acid (J acid) while adjusting the pH value to 7–8 by the use of an aqueous solution of sodium hydroxide, to which was then added 9.8 parts of maleic anhydride while maintaining the pH value at 6–7 by the use of a 20% aqueous solution of sodium carbonate at a temperature of 25°–30° C. The resulting mixture was stirred at this temperature for one hour.

After adding 16 parts of sodium bicarbonate and cooling the mixture to 5°–10° C., a solution prepared by diazotizing 20.3 parts of 4-methoxyaniline-2-sulfonic acid by the usual method was added thereto. After stirring the mixture at this temperature for 5 hours, it was adjusted to pH 3 with hydrochloric acid, heated to 70° C. and kept at this temperature for 5 hours.

After neutralizing it to pH 6-7 with sodium hydroxide solution, an amount, corresponding to 15% of the amount of the liquid mixture, of sodium chloride was added to deposit a crystalline product. By collecting the crystal by filtration, a compound represented by the following formula was obtained in a yield of 95%.

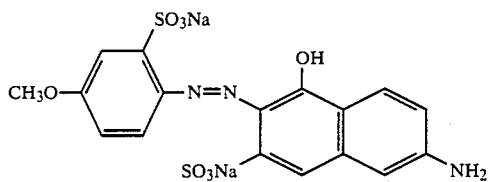

In another run, the same procedure as above was repeated, except that acetic anhydride was substituted for maleic anhydride. The results of the two runs are compared in the following Table 4.

TABLE 4

| Acylating agent | Necessary amount of acylating agent*1 (mol/mol) | Composition after acylation | | Liquid viscosity at the time of coupling | Conditions of hydrolysis of acylamino group*2 | | |
|---|---|---|---|---|---|---|---|
| | | N—Acyl compound (%) | Diacyl compound (%) | | Amount of hydrochloric acid (mol/mol) | Temperature (°C.) | Yield (%) |
| Maleic anhydride | 1.0 | 99 | 0 | Good | 0.3 | 70 | 95 |
| Acetic anhydride | 1.2 | 91 | 7 | Very viscous | 3 | 95 | 82 |

*1 Molar ratio of acylating agent to J acid necessary for making the amount of unreacted J acid 1% by mole or less.
*2 The amount of hydrochloric acid (molar ratio to J acid) and reaction temperature necessary for making the amount of unreacted acylamino compound 1% by mole or less within 5 hours.

EXAMPLE 16

The compound obtained in Example 15 was dissolved into 700 parts of water, into which was dropped 14.4 parts of 2,4,6-trifluoro-5-chloropyrimidine at 20°-25° C. while maintaining the pH value at 7-8 by the use of 1N solution of sodium hydroxide. The resulting mixture was stirred at this temperaure for 3 hours. By drying the reaction mixture under reduced pressure at a temperature not higher than 50° C., there was obtained a clear scarlet colored reactive dye having a structure represented by the following formula:

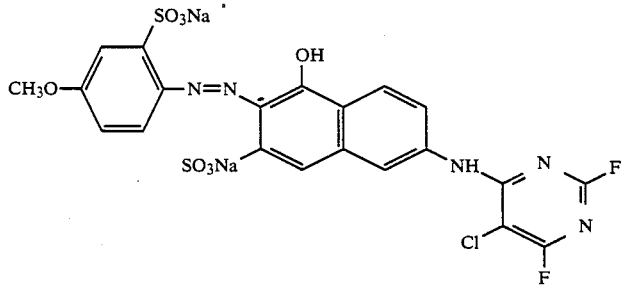

EXAMPLE 17

Into 200 parts of water was dissolved 31.9 parts of 4-amino-5-hydroxynaphthalene-2,7-disulfonic acid while adjusting the pH value to 6-7 by the use of potassium carbonate, to which was then added 10.0 parts of succinic anhydride. After adding 6.9 parts of potassium carbonate and stirring the mixture at 20°-30° C. for one hour, the mixture was cooled to 10°-15° C. and a solution prepared by diazotizing 13.7 parts of anthranilic acid by the usual method was added thereto while maintaining the pH value at 6-7 by the use of a 10% aqueous solution of potassium carbonate. After stirring the mixture at this temperature for 5 hours, 11.2 parts of potassium hydroxide was added and the resulting mixture was heated to 70° C. It was kept at this temperature for 4 hours and was then neutralized to pH 7-8 with hydrochloric acid, after which an amount, corresponding to 10% of the amount of liquid mixture, of potassium chloride was added to deposit a crystalline product. By collecting the crystal by filtration, a compound represented by the following formula was obtained in a yield of 93%.

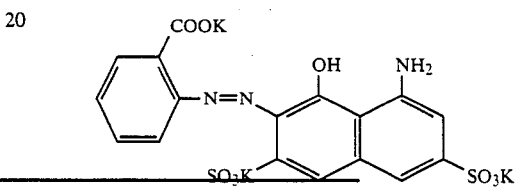

EXAMPLE 18

The compound obtained in Example 17 was dissolved into 1,000 parts of water, to which was added 17.9 parts of cyanuric chloride at 10°-15° C. The resulting mixture was stirred for 4 hours while adjusting the pH value to 6-7 with a 10% aqueous solution of potassium carbonate. Then, 30.2 parts of 2-(4-aminophenyl)-6-methylbenzothiazole-7-sulfonic acid was added. The mixture was heated to 50° C. while adjusting the pH value to 6-7, stirred at this temperature for 3 hours and then spray-dried. The dye thus obtained was a clear red colored direct dye having a structure represented by the following formula:

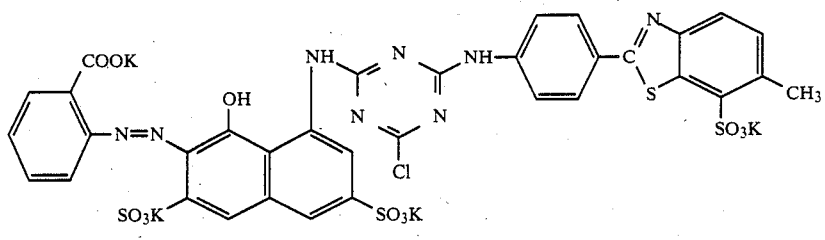

EXAMPLE 19

Into 200 parts of water was dissolved 31.9 parts of 4-amino-5-hydroxynaphthalene-1,7-disulfonic acid while adjusting the pH value to 7–8 with an aqueous solution of sodium hydroxide, to which was then added 8.4 parts of sodium bicarbonate. After adding 10.0 parts of succinic anhydride at a temperature of 30°–40° C., the resulting mixture was stirred at this temperature for 2 hours. It was then cooled to 5°–10° C., and a solution prepared by diazotizing 22.3 parts of 2-aminonaphthlane-1-sulfonic acid by the usual method was added thereto while maintaining the pH value at 5–6 by the use of a 20% aqueous solution of sodium carbonate. After stirring the mixture at this temperature for 5 hours, it was adjusted to pH 3 with hydrochloric acid and then heated to 70° C. After keeping the mixture at this temperature for 4 hours and then neutralizing it to pH 7–8 with an aqueous solution of sodium hydroxide, an amount, corresponding to 10% of the amount of liquid mixture, of sodium chloride was added to deposit a crystalline product. By collecting the crystal by filtration, a compound represented by the following formula was obtained in a yield of 94%.

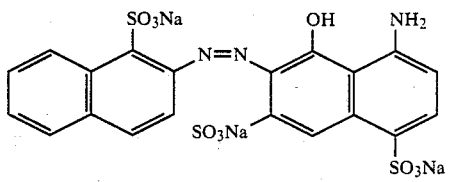

EXAMPLES 20–24

By repeating the procedure of Example 19, the compounds shown in Table 5 were obtained in high yields from the aminonaphtholsulfonic acid (II) and amine (III) shown in the following Table 5.

TABLE 5

| Example No. | Aminonaphtholsulfonic acid (II) | Acylating agent | Amine (III) | Arylazo-aminonaphtholsulfonic acid (I) | Yield |
|---|---|---|---|---|---|
| 20 | OH NH₂ / SO₃H / SO₃H (naphthalene) | Maleic anhydride | SO₃H—C₆H₃(NH₂)—NHCOCH=CHCOOH | corresponding azo product | 94% |
| 21 | OH NH₂ / SO₃H / SO₃H (naphthalene) | Citraconic anhydride | Cl, OCH₃—C₆H₂—NH₂ / SO₃H | corresponding azo product | 93% |
| 22 | OH NH₂ / SO₃H / SO₃H (naphthalene) | Glutaric anhydride | SO₃H—C₁₀H₅—NH₂ / SO₃H | corresponding azo product | 95% |
| 23 | OH / SO₃H / NH₂ (naphthalene) | Succinic anhydride | NH₂—C₁₀H₅—SO₃H / SO₃H | corresponding azo product | 95% |
| 24 | OH / NH₂ / SO₃H / SO₃H (naphthalene) | Methylsuccinic anhydride | CH₃, O₂N—C₆H₃—NH₂ | corresponding azo product | 92% |

What is claimed is:

1. A process for producing an arylazo-aminonaphtholsulfonic acid represented by a free acid of the formula,

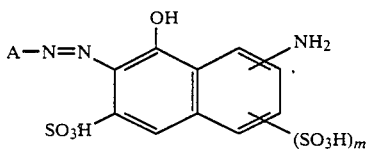

wherein A is a phenyl or naphthyl group unsubstituted or substituted by one to four members selected from alkyl, alkoxy, phenoxy, sulfonic acid, carboxylic acid, arylamino, amino, nitro and hydroxyl groups and halogen atoms, and m is 0 or 1, which comprises reacting an aminonaphtholsulfonic acid represented by a free acid of the formula,

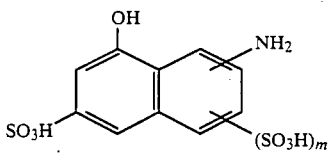

wherein m is as defined above, with a dibasic acid anhydride selected from the group consisting of maleic anhydride and succinic anhydride to obtain an acylaminonaphtholsulfonic acid, coupling a diazonium compound of amine of the formula, $$A'-NH_2$$

wherein A' is a phenyl or naphthyl group unsubstituted or substituted by one to four members selected from alkyl, alkoxy, phenoxy, sulfonic acid, carboxylic acid, arylamino, maleinylamino, nitro and hydroxyl groups and halogen atoms, with the acylaminonaphtholsulfonic acid, and then subjecting the resulting coupling product to hydrolysis in the presence of an acid or an alkali.

2. The process according to claim 1, wherein the reaction between the aminonaphtholsulfonic acid and the dibasic acid anhydride is carried out at a pH of 4 to 10 and at a temperature of 10° to 40° C.

3. The process according to claim 1, wherein the coupling is carried out at a pH of 4 to 8 and at a temperature of 0° to 30° C.

4. The process according to claim 1, wherein the hydrolysis is carried out at a temperature of 50° to 100° C. using 0.1 to 3 moles per mole of the coupling product of an acid or an alkali.

* * * * *